(12) United States Patent
Rapoport et al.

(10) Patent No.: US 12,530,080 B2
(45) Date of Patent: Jan. 20, 2026

(54) SYSTEMS AND METHODS FOR SELF-CALIBRATING NEURAL DECODING

(71) Applicant: PRECISION NEUROSCIENCE CORPORATION, New York, NY (US)

(72) Inventors: Benjamin I. Rapoport, New York, NY (US); Craig H. Mermel, New York, NY (US); Daniel Trietsch, New York, NY (US); Elton Ho, New York, NY (US); Kazutaka Takahashi, New York, NY (US)

(73) Assignee: PRECISION NEUROSCIENCE CORPORATION, New York, NY (US)

( * ) Notice: Subject to any disclaimer, the term of this patent is extended or adjusted under 35 U.S.C. 154(b) by 0 days.

(21) Appl. No.: 18/491,351

(22) Filed: Oct. 20, 2023

(65) Prior Publication Data

US 2025/0130641 A1 Apr. 24, 2025

Related U.S. Application Data

(60) Provisional application No. 63/417,831, filed on Oct. 20, 2022.

(51) Int. Cl.
*G06F 3/01* (2006.01)
(52) U.S. Cl.
CPC .................. *G06F 3/015* (2013.01)
(58) Field of Classification Search
CPC ...................................... G06F 3/015
See application file for complete search history.

(56) References Cited

U.S. PATENT DOCUMENTS 5,709,689 A 1/1998 Ferrante et al.
5,910,282 A 6/1999 Grozdanovski et al.
(Continued)

FOREIGN PATENT DOCUMENTS

AU 2020428944 A1 9/2022
AU 2024203319 A1 6/2024
(Continued)

OTHER PUBLICATIONS

International Search Report and Written Opinion of the International Searching Authority issued in International Application No. PCT/US2023/035624, 15 pages, dated Feb. 26, 2024.
(Continued)

*Primary Examiner* — David D Davis
(74) *Attorney, Agent, or Firm* — DLA Piper LLP US

(57) ABSTRACT

Systems and methods related to recalibrating neural devices based on external sensory information are disclosed. The systems can include a neural device configured to sense data associated with the subject or receive control input, a sensor communicably coupled to the external device, the sensor configured to detect a state associated with the subject, and an external device communicably coupled to the neural device and the sensor. The external device can recalibrate a neural decoding model based on the state detected via the sensor, wherein the neural decoding model correlates the data received from the neural device with a corresponding thought or action performed by the subject.

18 Claims, 7 Drawing Sheets

(56) References Cited

U.S. PATENT DOCUMENTS

| | | |
|---|---|---|
| 6,831,991 B2 | 12/2004 | Fridrich et al. |
| 7,389,144 B1 | 6/2008 | Osorio et al. |
| 7,818,061 B1 | 10/2010 | Palmer |
| 7,925,350 B1 | 4/2011 | Palmer |
| 8,156,568 B2 | 4/2012 | Gaitas et al. |
| 8,170,670 B2 | 5/2012 | Stubbs et al. |
| 8,515,538 B1 | 8/2013 | Osorio et al. |
| 8,516,568 B2 | 8/2013 | Cohen |
| 8,546,568 B2 | 10/2013 | Inouye et al. |
| 8,634,918 B2 | 1/2014 | Chambers |
| 9,314,618 B2 | 4/2016 | Imran et al. |
| 9,549,704 B1 | 1/2017 | Buerger et al. |
| 10,135,849 B2 | 11/2018 | Jha et al. |
| 10,265,081 B2 | 4/2019 | Kennedy et al. |
| 10,363,420 B2 | 7/2019 | Fried et al. |
| 11,013,923 B1 | 5/2021 | Eubanks |
| 11,185,684 B2 | 11/2021 | Cadwell |
| 11,640,204 B2 | 5/2023 | Shenoy et al. |
| 12,008,987 B2 | 6/2024 | Stavisky et al. |
| 2001/0054758 A1 | 12/2001 | Isaak |
| 2003/0057506 A1 | 3/2003 | Li et al. |
| 2005/0228421 A1 | 10/2005 | Bilenski et al. |
| 2005/0261934 A1 | 11/2005 | Thompson |
| 2006/0015153 A1 | 1/2006 | Gliner et al. |
| 2006/0106431 A1 | 5/2006 | Wyler et al. |
| 2006/0253163 A1 | 11/2006 | Stubbs et al. |
| 2007/0005691 A1 | 1/2007 | Pushparaj |
| 2007/0282398 A1 | 12/2007 | Healey et al. |
| 2009/0082829 A1 | 3/2009 | Panken et al. |
| 2009/0088763 A1 | 4/2009 | Aram et al. |
| 2009/0132061 A1 | 5/2009 | Stubbs et al. |
| 2009/0312817 A1 | 12/2009 | Hogle et al. |
| 2011/0093052 A1 | 4/2011 | Anderson et al. |
| 2011/0245835 A1 | 10/2011 | Dodds et al. |
| 2012/0139269 A1 | 6/2012 | Kouzuma |
| 2012/0277834 A1 | 11/2012 | Mercanzini et al. |
| 2012/0302959 A1 | 11/2012 | Fielder et al. |
| 2013/0014982 A1 | 1/2013 | Segawa et al. |
| 2013/0144362 A1 | 6/2013 | Lee |
| 2013/0144365 A1 | 6/2013 | Kipke et al. |
| 2013/0331856 A1 | 12/2013 | Sage |
| 2014/0051960 A1 | 2/2014 | Badower et al. |
| 2014/0100586 A1 | 4/2014 | Pianca et al. |
| 2014/0194944 A1 | 7/2014 | Romanelli et al. |
| 2015/0111930 A1 | 4/2015 | Aung-Din |
| 2015/0151114 A1 | 6/2015 | Black et al. |
| 2015/0265180 A1 | 9/2015 | Venkatesan et al. |
| 2015/0367122 A1 | 12/2015 | Morshed et al. |
| 2016/0007874 A1 | 1/2016 | Ma et al. |
| 2016/0120457 A1 | 5/2016 | Wu et al. |
| 2016/0174863 A1 | 6/2016 | Foerster et al. |
| 2016/0331994 A1 | 11/2016 | Smith et al. |
| 2017/0100580 A1 | 4/2017 | Olson |
| 2017/0108926 A1 | 4/2017 | Moon et al. |
| 2017/0113046 A1 | 4/2017 | Fried et al. |
| 2017/0224980 A1 | 8/2017 | Grasso et al. |
| 2017/0235663 A1 | 8/2017 | Kattepur et al. |
| 2017/0246452 A1 | 8/2017 | Liu et al. |
| 2017/0259072 A1 | 9/2017 | Newham et al. |
| 2018/0078767 A1 | 3/2018 | Rapoport et al. |
| 2018/0236221 A1 | 8/2018 | Opie et al. |
| 2018/0332009 A1 | 11/2018 | Lange |
| 2019/0110754 A1 | 4/2019 | Rao et al. |
| 2019/0134396 A1 | 5/2019 | Toth et al. |
| 2019/0150774 A1 | 5/2019 | Brinkmann et al. |
| 2019/0333505 A1 | 10/2019 | Stavisky et al. |
| 2020/0061374 A1 | 2/2020 | Mitchell |
| 2020/0069427 A1 | 3/2020 | Swennen et al. |
| 2020/0078586 A1 | 3/2020 | Wijseundara et al. |
| 2020/0155828 A1 | 5/2020 | Shepard et al. |
| 2020/0206503 A1 | 7/2020 | Ganzer et al. |
| 2020/0215318 A1 | 7/2020 | Fielder et al. |
| 2020/0222010 A1 | 7/2020 | Howard |
| 2020/0310442 A1 | 10/2020 | Halder et al. |
| 2020/0337579 A1 | 10/2020 | Auerbach et al. |
| 2020/0364539 A1 | 11/2020 | Ansimov et al. |
| 2021/0033559 A1 | 2/2021 | Panat et al. |
| 2021/0034906 A1 | 2/2021 | Van Welzen et al. |
| 2021/0085988 A1 | 3/2021 | Nin et al. |
| 2021/0186450 A1 | 6/2021 | Vancamberg et al. |
| 2021/0213279 A1 | 7/2021 | Rapoport et al. |
| 2021/0252289 A1 | 8/2021 | Esteller |
| 2021/0267523 A1 | 9/2021 | Donoghue et al. |
| 2021/0267526 A1 | 9/2021 | Donoghue et al. |
| 2021/0268265 A1 | 9/2021 | Eder et al. |
| 2021/0272687 A1 | 9/2021 | Klopfenstein et al. |
| 2021/0275807 A1 | 9/2021 | Bouton |
| 2021/0280309 A1 | 9/2021 | Klopfenstein et al. |
| 2021/0353439 A1 | 11/2021 | Norman et al. |
| 2022/0005465 A1 | 1/2022 | Prabhavalkar et al. |
| 2022/0117511 A1 | 4/2022 | Shor et al. |
| 2022/0175320 A1 | 6/2022 | Shah et al. |
| 2022/0184403 A1 | 6/2022 | Chouinard et al. |
| 2022/0208173 A1 | 6/2022 | Chang et al. |
| 2022/0211312 A1 | 7/2022 | Brinkmann et al. |
| 2022/0218264 A1 | 7/2022 | Brunner et al. |
| 2022/0240833 A1 | 8/2022 | Oxley |
| 2022/0301563 A1 | 9/2022 | Chang et al. |
| 2022/0370805 A1 | 11/2022 | Cogan et al. |
| 2022/0379117 A1 | 12/2022 | Spector |
| 2022/0413612 A1 | 12/2022 | Gribetz |
| 2023/0059718 A1 | 2/2023 | Hor-Lao et al. |
| 2023/0062326 A1 | 3/2023 | Colachis et al. |
| 2023/0111217 A1 | 4/2023 | Weiss |
| 2023/0113727 A1 | 4/2023 | Van Der Zalm et al. |
| 2023/0210427 A1 | 7/2023 | Rapoport et al. |
| 2023/0253104 A1 | 8/2023 | Serruya et al. |
| 2023/0271007 A1 | 8/2023 | Ganzer et al. |
| 2023/0320417 A1 | 10/2023 | Renner et al. |
| 2023/0389851 A1 | 12/2023 | Tal et al. |
| 2023/0414947 A1 | 12/2023 | Esteller |
| 2024/0029717 A1 | 1/2024 | Jain et al. |
| 2024/0115178 A1 | 4/2024 | Benjamin, I |
| 2024/0139512 A1 | 5/2024 | Schulhauser et al. |
| 2024/0374893 A1 | 11/2024 | Robinson et al. |
| 2024/0399152 A1 | 12/2024 | Powell et al. |
| 2025/0010070 A1 | 1/2025 | Ganzer et al. |

FOREIGN PATENT DOCUMENTS

| | | | |
|---|---|---|---|
| CN | 110876652 A | 3/2020 | |
| KR | 20200074951 A | 6/2020 | |
| WO | 2008052166 A2 | 5/2008 | |
| WO | 2012143850 A1 | 10/2012 | |
| WO | 2015191628 A1 | 12/2015 | |
| WO | WO-2015195553 A1 * | 12/2015 | ........... A61B 5/0006 |
| WO | 2017160627 A2 | 9/2017 | |
| WO | 2017196971 A1 | 11/2017 | |
| WO | 2019079475 A1 | 4/2019 | |
| WO | 2019152648 A1 | 8/2019 | |
| WO | 2019211314 A1 | 11/2019 | |
| WO | 2020008016 A1 | 1/2020 | |
| WO | 2020008017 A1 | 1/2020 | |
| WO | 2020142384 A1 | 7/2020 | |
| WO | 2020219371 A1 | 10/2020 | |
| WO | 2021021714 A1 | 2/2021 | |
| WO | 2021055682 A1 | 3/2021 | |
| WO | 2021162795 A1 | 8/2021 | |
| WO | 2021174061 A1 | 9/2021 | |
| WO | 2022011260 A1 | 1/2022 | |
| WO | 2022126059 A1 | 6/2022 | |
| WO | 2022251151 A1 | 12/2022 | |
| WO | 2024254360 A1 | 12/2024 | |

OTHER PUBLICATIONS

International Search Report and Written Opinion of the International Searching Authority issued in International Application No. PCT/US2022/082619, 16 pages, dated Jun. 2, 2023.
International Search Report and Written Opinion of the International Searching Authority issued in International Application No. PCT/US2023/035627, 13 pages, dated Feb. 9, 2024.

(56) References Cited

OTHER PUBLICATIONS

International Search Report and Written Opinion of the International Searching Authority issued in International Application No. PCT/US2023/035625, 13 pages, dated Feb. 26, 2024.
International Search Report and Written Opinion of the International Searching Authority issued in International Application No. PCT/US2023/035620, 14 pages, dated Feb. 15, 2024.
International Search Report and Written Opinion of the International Searching Authority issued in International Application No. PCT/US2022/078130, 11 pages, dated Feb. 16, 2023.
International Search Report and Written Opinion of the International Searching Authority issued in International Application No. PCT/US2023/063894, 14 pages, dated Sep. 29, 2023.
International Search Report and Written Opinion of the International Searching Authority issued in International Application No. PCT/US2023/035623, 10 pages, dated Feb. 8, 2024.
Camara et al., "Security and Privacy Issues in Implantable Medical Devices: A Comprehensive Survey", Journal of Biomedical Informatics, vol. 55, 45 pages, Jun. 11, 2015.
Hettick et al, "The Layer 7 Cortical Interface: A Scalable and Minimally Invasive Brain-Computer Interface Program". bioRxiv, 42 pages, Jan. 30, 2024.
Liu et al, "An Energy-Efficient Compressed Sensing-Based Encryption Scheme for Wireless Neural Recording," IEEE Journal on Emerging Topic in Circuits and Systems, 10 pages, Jun. 2021.
Wang et al, "Unsupervised Decoding of Long-Term, Naturalistic Human Neural Recordings with Automated Video and Audio Annotations", frontiers in Human Neuroscience, vol. 10, Article 165, 13 pages, Apr. 21, 2016.
Sorrell et al, "Brain-Machine Interfaces: Closed-Loop Control in an Adaptive System", Annual Review of Control, Robotics, and Autonomous Systems, vol. 4, pp. 167-189, Jan. 29, 2021.
International Search Report and Written Opinion of the International Searching Authority issued in International Application No. PCT/US2023/077626, 12 pages, dated Feb. 28, 2024.
International Preliminary Report on Patentability for Application No. PCT/US2022/78130, mailed on Apr. 25, 2024, 8 Pages.
International Preliminary Report on Patentability for the Application No. PCT/US2022/82619, mailed on Jul. 11, 2024, 9 pages.
International Preliminary Report on Patentability for the Application No. PCT/US2023/063894, mailed Sep. 19, 2024, 12 pages.
International Search Report and Written Opinion for Application No. PCT/US2024/017647, mailed on Jun. 6, 2024, 13 pages.
International Search Report and Written Opinion for Application No. PCT/US2024/028423, mailed on Jul. 18, 2024, 13 pages.
Kim T., et al., "Spatiotemporal Compression for Efficient Storage and Transmission of High-Resolution Electrocorticography Data," Annual International Conference of the IEEE Engineering in Medicine and Biology Society, Aug. 28, 2012, pp. 1012-1015.
Office Action for Canadian Patent Application No. 3241544, mailed Jul. 25, 2024, 3 pages.
Biederman W., et al., "A Fully-Integrated, Miniaturized (0.125 mm$^2$) 10.5 uW Wireless Neural Sensor," IEEE Journal of Solid-state Circuits, 2013, vol. 48, No. 4, pp. 960-970.
Coelho K., et al., "Cryptographic Algorithms in Wearable Communications: An Empirical Analysis," IEEE Communications Letters, 2019, vol. 23, No. 11, pp. 1931-1934.
Examination Report No. 1 for Australian Patent Application No. 2023230897 dated Jun. 26, 2025, 10 pages.
Ghoreishizadeh S.S., et al., "A Lightweight Cryptographic System for Implantable Biosensors," Proceedings of 2014 IEEE Biomedical Circuits and Systems Conference (BioCAS), 2014, pp. 472-475.
Hinterberger T., et al., "Voluntary Brain Regulation and Communication with Electrocorticogram Signals," Epilepsy and Behavior, Aug. 1, 2008, vol. 13, No. 2, pp. 300-306.
International Search Report and Written Opinion for Application No. PCT/US2025/019165, mailed on Jun. 6, 2025, 18 pages.
Kim H., et al., "A Configurable and Low-Power Mixed Signal SoC for Portable ECG Monitoring Applications," IEEE Transactions on Biomedical Circuits and Systems, 2014, vol. 8, No. 2, pp. 257-267.

Schwemmer M.A., et al., "Meeting Brain-Computer Interface User Performance Expectations Using a Deep Neural Network Decoding Framework," Nature Medicine, Sep. 24, 2018, vol. 24, No. 11, pp. 1669-1676.
Yanagisawa T., et al., "Electrocorticographic Control of a Prosthetic Arm in Paralyzed Patients," Annals of Neurology, 2012, vol. 71, No. 3, pp. 353-361.
Alim S.A., et al., "Some Commonly Used Speech Feature Extraction Algorithms," IntechOpen, 2018, vol. 1, 18 pages.
Anumanchipalli G.K., et al., "Speech Synthesis from Neural Decoding of Spoken Sentences," Nature, Apr. 2019, vol. 568, No. 7753, pp. 493-498.
Collobert R., et al., "A Fully Differentiable Beam Search Decoder," A preprint, Feb. 19, 2019, 11 pages.
Defossez A., et al., "Decoding Speech Perception from Non-invasive Brain Recordings," Nature Machine Intelligence, Oct. 5, 2023, vol. 5, pp. 1097-1107.
Duraivel S., et al., "High-resolution Neural Recordings Improve the Accuracy of Speech Decoding," Nature Communications, Nov. 6, 2023, vol. 14, No. 6938, 16 pages.
Haufe S., et al., "Elucidating Relations Between Fmri, Ecog and Eeg Through a Common Natural Stimulus," Publication bioRxiv. Oct. 22, 2017.
Inclusive Technology., "Inclusive Eyegaze Education with Mygaze Eye Tracker—Discontinued," Spectronics, Feb. 25, 2025, 8 pages, Retrieved from the Internet: URL: https://www.spectronics.com.au/product/inclusive-eyegaze-education-with-mygaze-eye-tracker#mygaze.
International Preliminary Report on Patentability for the Application No. PCT/US2023/035623, mailed May 1, 2025, 9 pages.
International Preliminary Report on Patentability for the Application No. PCT/US2023/035624, mailed May 1, 2025, 9 pages.
International Preliminary Report on Patentability for the Application No. PCT/US2023/035625, mailed May 1, 2025, 7 pages.
International Preliminary Report on Patentability for the Application No. PCT/US2023/035627, mailed May 1, 2025, 8 pages.
International Search Report and Written Opinion for Application No. PCT/US2024/043449, mailed on Nov. 15, 2024, 16 pages.
International Search Report and Written Opinion for Application No. PCT/US2025/011619, mailed on Mar. 27, 2025, 13 Pages.
Meta, "AI Speech Research Voicebox: Text-guided Multilingual Universal Speech Generation at Scale," Voicebox, Research by Meta AI, 2023, 8 pages, Retrieved on Feb. 25, 2025, Retrieved from the Internet: URL: https://voicebox.metademolab.com/.
International Preliminary Report on Patentability issued in International Application No. PCT/US2023/035620, 9 pages, dated May 1, 2025.
Chen Z.S., "Emerging Brain-to-content Technologies from Generative AI and Deep Representation Learning In the Spotlight)," IEEE Signal Processing Magazine, Nov. 2024, vol. 41, No. 6, pp. 94-104.
International Preliminary Report on Patentability for the Application No. PCT/US2023/035620, mailed May 1, 2025, 9 pages.
Beck C., et al., "Block Cipher Based Security for Severely Resource-Constrained Implantable Medical Devices," In Proceedings of the 4th International Symposium on Applied Sciences in Biomedical and Communication Technologies (ISABEL '11) Association for Computing Machinery, Oct. 26, 2011, No. 62, pp. 1-5.
Bridges D.C., et al., "MEA Viewer: A High-performance Interactive Application for Visualizing Electrophysiological Data," PLoS One, Feb. 9, 2018, vol. 12, No. 2, 10 pages.
Daemen J., et al., "AES Proposal: Rijndael," National Institute of Standards and Technology, 1999, 47 pages.
Judy M., et al., "A Nonlinear Signal-Specific ADC for Efficient Neural Recording," Biomedical Circuits and Systems Conference (BioCAS), 2010, pp. 17-20.
Kester Q.A., "A Cryptographic Image Encryption Technique for Facial-Blurring of Images," International Journal of Advanced Technology & Engineering Research, May 2013, vol. 3, No. 3, pp. 1-7.
Maji S., et al., "A Low-power Dual-Factor Authentication Unit for Secure Implantable Devices" IEEE Custom Integrated Circuits Conference (CICC), 2020, 10 pages, Retrieved from the Internet URL: https://arxiv.org/pdf/2004.13709.

(56) References Cited

OTHER PUBLICATIONS

Matsushita K., et al., "A Fully Implantable Wireless ECoG 128-Channel Recording Device for Human Brain-machine Interfaces: W-HERBS," Frontiers in Neuroscience, Jul. 30, 2018, vol. 12, No. 511, 11 pages.

Ogawa H., et al., "Rapid and Minimum Invasive Functional Brain Mapping by Real-time Visualization of High Gamma Activity During Awake Craniotomy," World Neurosurgery, Nov. 2014, 10 pages.

Pallud J., et al., Direct Electrical Bipolar Electrostimulation for Functional Cortical and Subcortical Cerebral Mapping in Awake Craniotomy. Practical Considerations, Neurochirurgie, Jun. 1, 2017, vol. 63, pp. 164-174.

Schneier B., "Description of a New Variable-Length Key, 64-Bit Block Cipher (Blowfish)," Fast Software Encryption, Cambridge Security Workshop Proceedings, Dec. 1993, pp. 191-204.

Tchoe Y., et al., "Human Brain Mapping with Multi-thousand Channel PtNRGrids Resolves Spatiotemporal Dynamics," Science Translational Medicine, Jan. 19, 2022, vol. 14, No. 628, 22 pages.

Third Party Prior Art Submission for U.S. Appl. No. 18/180,248, filed Aug. 12, 2025.

Thorpe C., et al., "A Coprime Blur Scheme for Data Security in Video Surveillance," In IEEE Transactions on Pattern Analysis and Machine Intelligence, 2013, vol. 35, No. 12, pp. 3066-3072.

Uy J., et al., "Stability of Maps of Human Motor Cortex Made with Transcranial Magnetic Stimulation," Brain Topography, Jun. 2002, vol. 14, No. 4, pp. 293-297.

Rohaut B., et al., "Uncovering Consciousness in Unresponsive ICU Patients: Technical, Medical and Ethical Considerations," Critical Care, Mar. 9, 2019, vol. 23, No. 78, 9 pages, doi: 10.1186/s13054-019-2370-4.

"What are polymides?", UBE Corporation, accessed on Sep. 19, 2025, accessed at https://www.ube.com/ube/en/contents/chemical/ploymide/ploymide_column.html (Year: 2025).

Escabi M.A., et al., "A high-density, high-channel count, multiplexed muECoG array for auditory-cortex recordings" Journal of Neurophysiology, 2014, vol. 112, No. 6, pp. 1566-1583.

Office Action for Canadian Patent Application No. 3,245,576, mailed Oct. 14, 2025, 5 pages.

\* cited by examiner

SYSTEMS AND METHODS FOR SELF-CALIBRATING NEURAL DECODING

PRIORITY

The present application claims priority to U.S. Provisional Patent Application No. 63/417,831, titled SELF-CALIBRATING NEURAL DECODING, filed Oct. 20, 2022, which is hereby incorporated by reference herein in its entirety.

BACKGROUND

Brain-computer interfaces have shown promise as systems for restoring, replacing, and augmenting lost or impaired neurological function in a variety of contexts, including paralysis from stroke and spinal cord injury, blindness, and some forms of cognitive impairment. Multiple innovations over the past several decades have contributed to the potential of these neural interfaces, including advances in the areas of applied neuroscience and multi-channel electrophysiology, mathematical and computational approaches to neural decoding, power-efficient custom electronics, and the development of application-specific integrated circuits, as well as materials science and device packaging. Nevertheless, the practical impact of such systems remains limited, with only a small number of patients worldwide having received highly customized interfaces through clinical trials.

High bandwidth brain-computer interfaces are being developed to enable the bidirectional communication between the nervous system and external computer systems, in order to assist, augment, or replace neurological function lost to disease or injury. A necessary capability of any brain-computer interface is the ability to accurately decode electrophysiologic signals recorded from individual neurons or populations of neurons and correlate such activity with one or more sensory stimuli or intended motor responses. For example, such a system may record activity from the primary motor cortex in an animal or a paralyzed human patient and attempt to predict the actual or intended movement of a specific body part.

While increasingly accurate, real-time decoding systems have been described in the literature, a fundamental limitation of existing systems is the need for frequent recalibration due to a combination of sensor displacement, degradation in the signal quality, and/or neural plasticity over time. For example, because neural interfaces are not directly anchored/connected to the neuron(s) they are recording, they can experience small amounts of translation and/or rotation resulting from differential inertial forces on the brain and interface with head movement. Biological reactions at the biotic-abiotic interface can further alter the relationship between recorded neural activity and motor/sensory stimuli, with the rate of this change depending on multiple factors, including the nature of the interface, the surgical approach used to implant the interface, and differences in individual biology. Finally, the underlying neural activity may change slowly over time due to either the underlying disease process or neural plasticity. For these reasons, existing solutions to neural decoding require frequent, lengthy, active calibration sessions to maintain accuracy for specific decoding tasks. The need for frequent calibration reduces the overall utility of the system as a brain-computer interface, as significant amounts of time and energy go into training, as opposed to benefiting from, the system.

Furthermore, brain-penetrating microelectrode arrays have facilitated high-spatial-resolution recordings for brain-computer interfaces, but at the cost of invasiveness and tissue damage that scale with the number of implanted electrodes. In some applications, softer electrodes have been used in brain-penetrating microelectrode arrays; however, it is not yet clear whether such approaches offer a substantially different tradeoff as compared to conventional brain-penetrating electrodes. For this reason, nonpenetrating cortical surface microelectrodes represent a potentially attractive alternative and form the basis of the system described here. In practice, electrocorticography (ECOG) has already facilitated capture of high quality signals for effective use in brain-computer interfaces in several applications, including motor and speech neural prostheses. Higher-spatial-resolution micro-electrocorticography (µECoG) therefore, represents a promising combination of minimal invasiveness and improved signal quality. Consequently, it would be highly beneficial for neural devices to use nonpenetrating cortical interfaces.

SUMMARY

The present disclosure is directed to systems and methods for calibrating neural interfaces. In particular, the present disclosure is directed towards decoding electrophysiologic signals emanating from high-bandwidth neural interfaces to predict motor intent or somatosensory, visual, and auditory stimuli.

A neural device system for use with a subject, the neural device system comprising: a neural device configured to sense data associated with the subject or receive control input, the neural device comprising an electrode array configured to stimulate or record from neural tissue with which the electrode array is engaged; a sensor communicably coupled to the external device, the sensor configured to detect a state associated with the subject; an external device communicably coupled to the neural device and the sensor, the external device comprising a processor and a memory, the memory storing instructions that, when executed by the processor, cause the external device to: recalibrate a neural decoding model based on the state detected via the sensor, wherein the neural decoding model correlates the data received from the neural device with a corresponding thought or action performed by the subject.

In one embodiment, the present disclosure is directed to a neural device system for use with a subject, the neural device system comprising: a neural device configured to sense data associated with the subject or receive control input, the neural device comprising an electrode array configured to stimulate or record from neural tissue with which the electrode array is engaged; a sensor configured to detect a state associated with the subject; a computer system communicably coupled to the neural device and the sensor, the computer system comprising a processor and a memory, the memory storing instructions that, when executed by the processor, cause the computer system to: recalibrate a neural decoding model based on the state detected via the sensor, wherein the neural decoding model correlates the data received from the neural device with a corresponding thought or action performed by the subject.

In one embodiment, the present disclosure is directed to a computer-implemented method of recalibrating a neural decoding model associated with a subject, the method comprising: receiving, by a computer system via a neural device comprising an electrode array configured to stimulate or record from neural tissue with which the electrode array is engaged, data associated with the subject, the neural device comprising an electrode array configured to stimulate or record from neural tissue with which the electrode array is engaged; detecting, by the computer system via a sensor, a state associated with the subject; and recalibrating, via the computer system, the neural decoding model based on the state detected via the sensor, wherein the neural decoding model correlates the data received from the neural device with a corresponding thought or action performed by the subject.

In some embodiments, the sensor is selected from the group consisting of an inertial sensor, a camera, a tactile sensor, and a microphone.

In some embodiments, the neural device system further includes further comprising a plurality of sensors configured to detect a plurality of states associated with the subject.

In some embodiments, the computer system is configured to recalibrate the neural decoding model based on the state detected via the sensor by: calculating an output of the neural decoding model for the data received from the neural device; determining the state associated with the subject via the sensor; retrieving historical values of the output of the neural decoding model to the determined state; and determining whether the calculated output of the neural decoding model is within an allowed limit from the historical values.

In some embodiments, the computer system is configured to recalibrate the neural decoding model based on the state detected via the sensor where the subject is performing one or more defined tasks by: recording a plurality of time-synced signals from the neural device and the sensor; determining which of the plurality of time-synced signals are relevant to whether a known action is occurring; extracting features from the plurality of time-synced signals determined to be relevant; entering the features into the neural decoding model; outputting a prediction on a probability of the known action being occurring; and determining whether the neural decoding model predictions correspond to the known task according to a predefined quality threshold.

In some embodiments, the recalibration of the neural decoding model is repeated for a plurality of defined tasks.

In some embodiments, the known action comprises hand motor output.

In some embodiments, the known action comprises speech.

In some embodiments, the known action comprises text generation.

In some embodiments, the neural device comprises a subdural implanted neural device.

FIGURES

DETAILED DESCRIPTION

The present disclosure is generally directed to systems and methods for the automatic calibration of mathematical models used to perform neural decoding in high-bandwidth neural interfaces. The system consists of a high-density neural interface in direct contact with the cortical or deep brain surfaces, along with one or more time-synced sensors recording motor, sensory, visual, or auditory feedback from the user's body or local environment. After an initial calibration phase involving the active input of the user and training of one or more neural decoding algorithms, the system uses passively collected information from the external sensors to keep the decoding algorithm calibrated against expected drift in the neural signals over time, thereby ensuring high-performance of the neural interface while minimizing the amount of active calibration required.

Neural Device Systems

Figure 1:
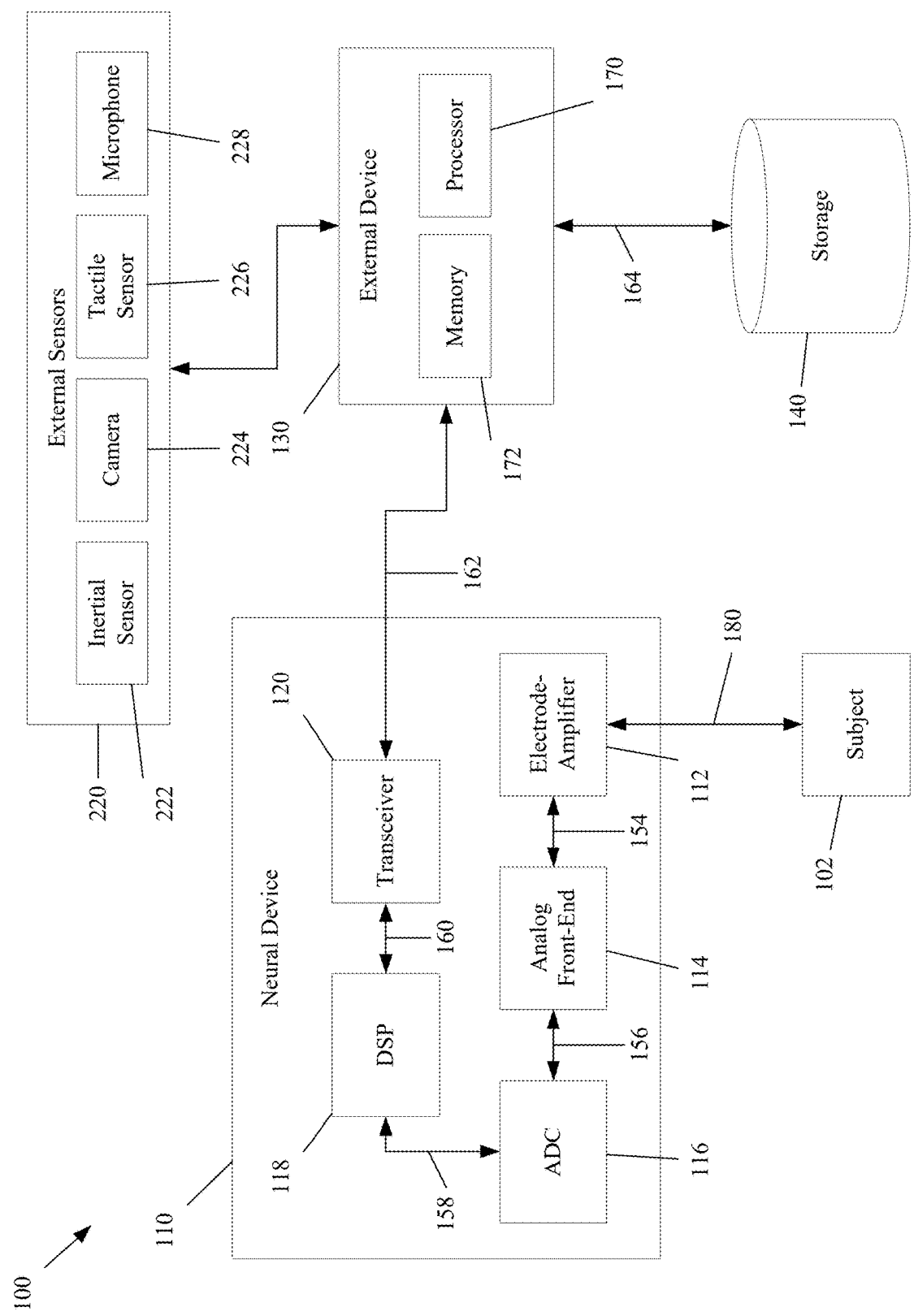
FIG. 1 depicts a block diagram of a neural device system, in accordance with an embodiment of the present disclosure.

Conventional neural devices typically include electrode arrays that penetrate a subject's brain in order to sense and/or stimulate the brain. Some embodiments of the present disclosure are directed to the neural devices having penetrating electrodes. However, some other embodiments of the present disclosure are directed to the use of nonpenetrating neural devices, i.e., neural devices having electrode arrays that do not penetrate the cortical surface. Such nonpenetrating neural devices are minimally invasive and minimize the amount of impact on the subject's cortical tissue. The present disclosure provides a system of recalibrating both the penetrating neural devices and the nonpenetrating neural devices. Neural devices can sense and record brain activity, receive instructions for stimulating the subject's brain, and otherwise interact with a subject's brain as generally described herein. Referring now to FIG. 1, there is shown a diagram of an illustrative system 100 including a neural device 110 that is communicatively coupled to an external device 130. The external device 130 can include any device to which the neural device 110 can be communicatively coupled, such as a computer system or mobile device (e.g., a tablet, a smartphone, a laptop, a desktop, a secure server, a smartwatch, a head-mounted virtual reality device, a head-mounted augmented reality device, or a smart inductive charger device). The external device 130 can include a processor 170 and a memory 172. In some embodiments, the external device 130 can include a server or a cloud-based computing system. In some embodiments, the external device 130 can further include or be communicatively coupled to storage 140. In one embodiment, the storage 140 can include a database stored on the external device 130. In another embodiment, the storage 140 can include a cloud computing system (e.g., Amazon Web Services or Azure).

The neural device 110 can include a range of electrical or electronic components. In the illustrated embodiment, the neural device 110 includes an electrode-amplifier stage 112, an analog front-end stage 114, an analog-to-digital converter (ADC) stage 116, a digital signal processing (DSP) stage 118, and a transceiver stage 120 that are communicatively coupled together. The electrode-amplifier stage 112 can include an electrode array, such as is described below, that is able to physically interface with the brain of the subject 102 in order to sense brain signals and/or apply electrical signals thereto. The analog front-end stage 114 can be configured to amplify signals that are sensed from or applied to the subject 102, perform conditioning of the sensed or applied analog signals, perform analog filtering, and so on. The front-end stage 114 can include, for example, one or more application-specific integrated circuits (ASICs) or other electronics. The ADC stage 116 can be configured to convert received analog signals to digital signals and/or convert received digital signals to an analog signal to be processed via the analog front-end stage 114 and then applied via the electrode-amplifier stage 112. The DSP stage 118 can be configured to perform various DSP techniques, including multiplexing of digital signals received via the electrode-amplifier stage 112 and/or from the external device 130. For example, the DSP stage 118 can be configured to convert instructions from the external device 130 to a corresponding digital signal. The transceiver stage 120 can be configured to transfer data from the neural device 110 to the external device 130 located outside of the body of the subject 102.

In various embodiments, the stages of the neural device 110 can provide unidirectional or bidirectional communications (as indicated in FIG. 1) by and between the neural device 110 and the external device 130. As indicated in FIG. 1, the external device 130 and the stages 112, 114, 116, 118, 120 of the neural device 110 may be electrically coupled by connectors 154, 156, 158, 160, 162, which may be electrical wires, busses, or any type of electrical connector that enables unidirectional or bidirectional communications. In various embodiments, one or more of the stages 112, 114, 116, 118, 120 can operate in a serial or parallel manner with other stages of the system 100. It can be understood that the depicted architecture for the system 100 is merely illustrative and the system 100 can be arranged in various different manners, i.e., stages or other components of the system 100 may be connected differently and/or the system 100 may include additional or alternate stages or components. For example, any of the stages may be arranged and operate in a serial or parallel fashion with other stages of the system 100.

Figure 2:
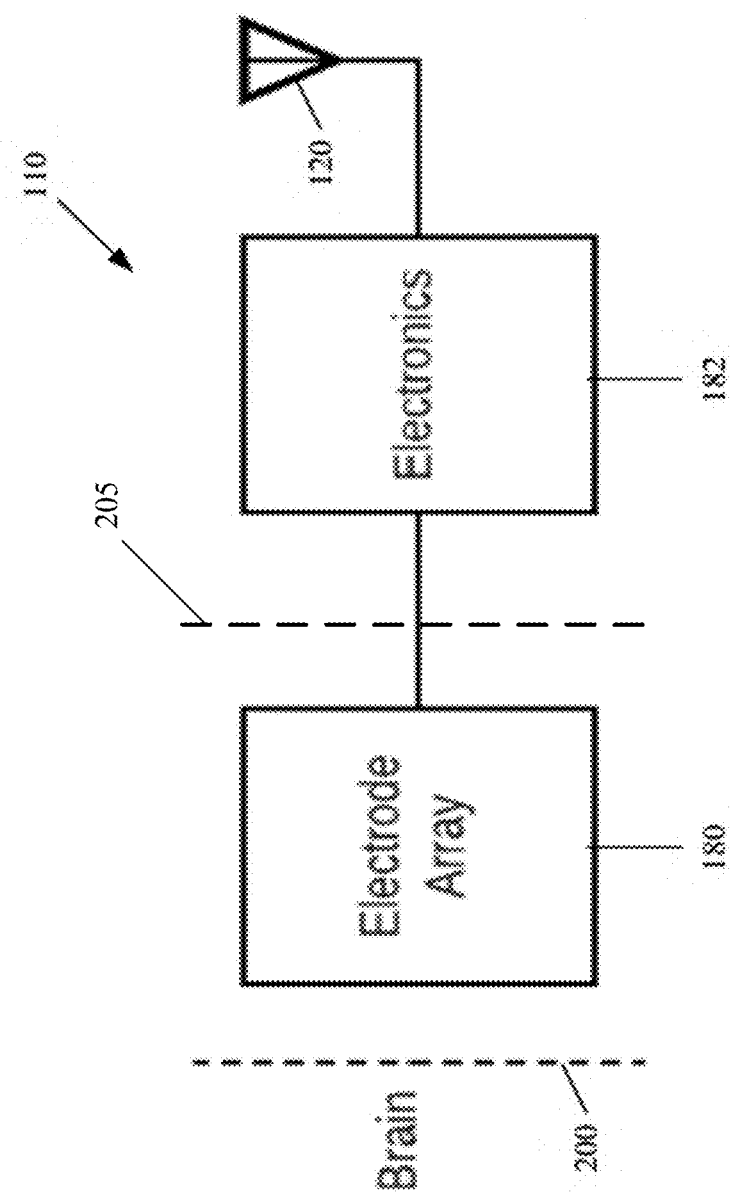
FIG. 2 depicts a diagram of a neural device, in accordance with an embodiment of the present disclosure.

In some embodiments, the neural device 110 described above can include a brain implant, such as is shown in FIG. 2. The neural device 110 may be a biomedical device configured to study, investigate, diagnose, treat, and/or augment brain activity. In some embodiments, the neural device 110 may be a subdural neural device, i.e., a neural device implanted between the dura 205 (i.e., the membrane surrounding the brain) and the cortical surface of the brain 200. In some embodiments, the neural device 110 may be positioned beneath the dura mater 205 or between the dura mater 205 and the arachnoid membrane. In some embodiments, the neural device 110 may be positioned in the subdural space, on the cortical surface of the brain 200. The neural device 110 may be inserted through an incision in the scalp 202 and across the dura 205. The neural device 110 can include an electrode array 180 (which may be a component of or coupled to the electrode-amplifier stage 112 described above) that is configured to record and/or stimulate an area of the brain 200. The electrode array 180 can be connected to an electronics hub 182 (which could include one or more of the electrode-amplifier stage 112, analog front-end stage 114, ADC stage 116, and DSP stage 118) that is configured to transmit via wireless or wired transceiver 120 to the external device 130 (in some cases, referred to as a "receiver").

The electrode array 180 can comprise nonpenetrating cortical surface microelectrodes (i.e., the electrode array 180 does not penetrate the brain 200). Accordingly, the neural device 110 can provide a high spatial resolution, with minimal invasiveness and improved signal quality. The minimal invasiveness of the electrode array 180 is beneficial because it allows the neural device 110 to be used with a larger population of patients than conventional brain implants, thereby expanding the application of the neural device 110 and allowing more individuals to benefit from brain-computer interface technologies. Furthermore, the surgical procedures for implanting the neural devices 110 are minimally invasive, reversible, and avoid damaging neural tissue. In some embodiments, the electrode array 180 can be a high-density microelectrode array that provides smaller features and improved spatial resolution relative to conventional neural implants.

In some embodiments, the neural device 110 includes an electrode array configured to stimulate or record from neural tissue adjacent to the electrode array, and an integrated circuit in electrical communication with the electrode array, the integrated circuit having an analog-to-digital converter (ADC) producing digitized electrical signal output. In some embodiments, the ADC or other electronic components of the neural device 110 can include an encryption module, such as is described below. The neural device 110 can also include a wireless transmitter (e.g., the transceiver 120) communicatively coupled to the integrated circuit or the encryption module and an external device 130. The neural device 110 can also include, for example, control logic for operating the integrated circuit or electrode array 180, memory for storing recordings from the electrode array, and a power management unit for providing power to the integrated circuit or electrode array 180.

Figure 3:
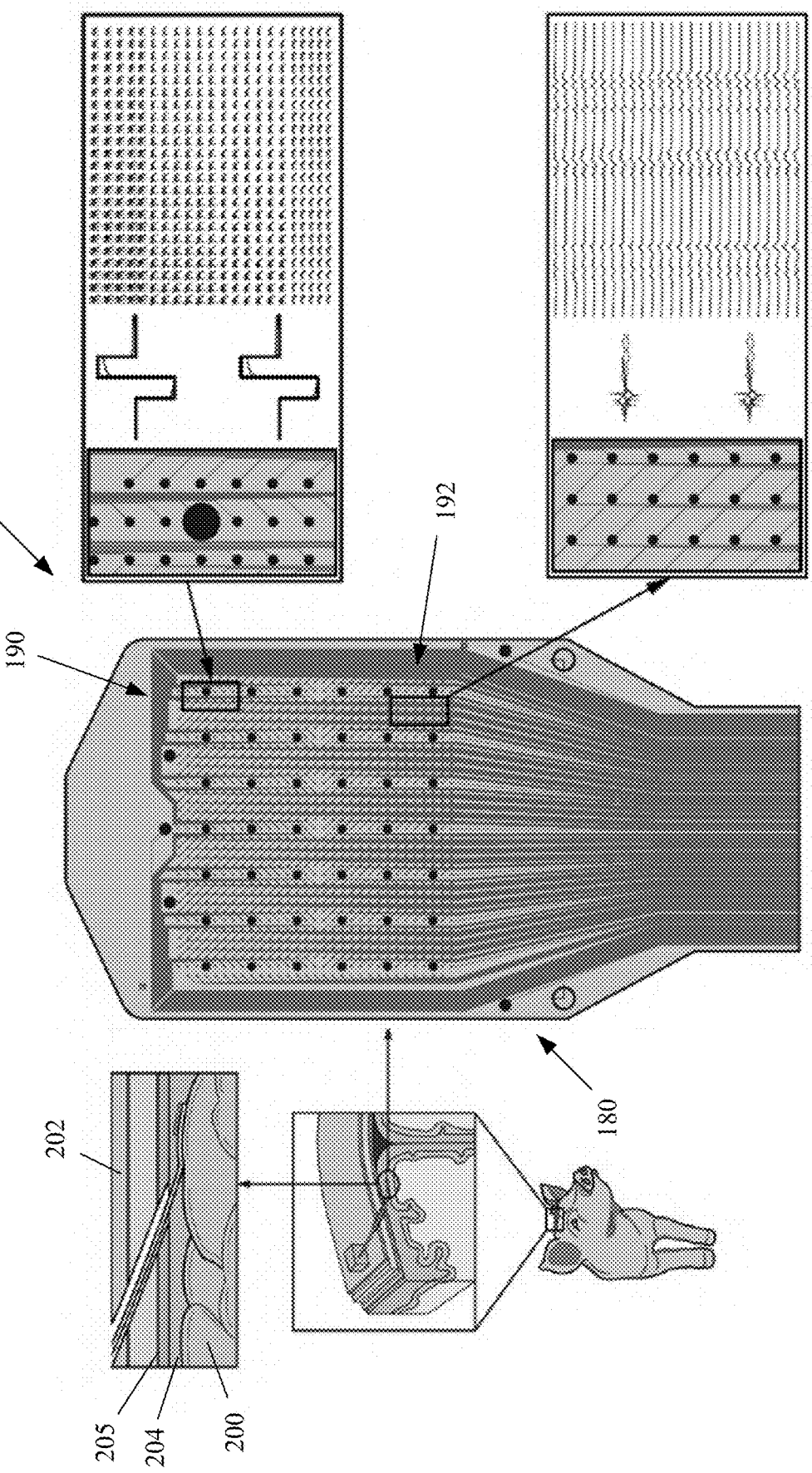
FIG. 3 depicts a diagram of a thin-film, microelectrode array neural device and implantation method, in accordance with an embodiment of the present disclosure.

Referring now to FIG. 3, there is shown a diagram of an illustrative embodiment of a neural device 110. In this embodiment, the neural device 110 comprises an electrode array 180 comprising nonpenetrating microelectrodes. As generally described above, the neural device 110 is configured for minimally invasive subdural implantation using a cranial micro-slit technique, i.e., is inserted into the subdural space 204 between the dura and the surface of the subject's brain 200. In some embodiments, the neural device 110 is inserted into the subdural space 204 between the dura and the surface of the brain 200. Further, the microelectrodes of the electrode array 180 can be arranged in a variety of different configurations and may vary in size. In this particular example, the electrode array 180 includes a first group 190 of electrodes (e.g., 200 µm microelectrodes) and a second group 192 of electrodes (e.g., 20 µm microelectrodes). Further, example stimulation waveforms in connection with the first group 190 of electrodes and the resulting post-stimulus activity recorded over the entire array is depicted for illustrative purposes. Still further, example traces from recorded neural activity recorded by the second group 192 of electrodes are likewise illustrated. In this example, the electrode array 180 provides multichannel data that can be used in a variety of electrophysiologic paradigms to perform neural recording of both spontaneous and stimulus-evoked neural activity as well as decoding and focal stimulation of neural activity across a variety of functional brain regions.

Additional information regarding brain-computer interfaces described herein can be found in Ho et al., The *Layer 7 Cortical Interface: A Scalable and Minimally Invasive Brain-Computer Interface Platform*, bioRxiv 2022.01.02.474656; doi: https://doi.org/10.1101/2022.01.02.474656, which is hereby incorporated by reference herein in its entirety.

In one embodiment, the system 100 can further include one or more sensors 220 that are configured to detect various actions or characteristics associated with the subject 102 in which the neural device 110 is implanted. As described in greater detail below, the system 100 can use data sensed from the actions and/or characteristics of the user to aid in calibrating the neural decoding algorithm. In various embodiments, the sensors 220 can include one or more of at least one of the following: an inertial sensor 222, a camera 224 or image sensor, a tactile sensor 226, or a microphone 228 or audio sensor. In particular, the sensors 220 can include any combination of different sensor types. The inertial sensors 222 can be configured to sense movement associated with the subject 102 or the part of the body to which the inertial sensors 222 are affixed. The inertial sensors 222 can include, for example, accelerometers or other sensors that are configured to detect movement that are attached to various parts of the body (e.g., mounted to the head, trunk, or limbs of the subject 102). The camera 224 or image sensor can be configured to record visual inputs to the subject's 102 field of vision. The camera 224 can include, for example, an eyeglass-mounted camera that is able to record the subject's 102 field of vision. The tactile sensors 226 can be configured to detect whether and where the subject 102 has touched an object. The tactile sensors 226 can include, for example, a keyboard or the touchscreen of a mobile device. In one embodiment, the sensors 220 can be time-synced to the neural device 110 so that signals/data can be compared between the neural device 110 and the sensors 220. The various sensors 220 can be communicably coupled to the external device 130, which can receive signals/data from both the neural device 110 and the one or more time-synced external sensors 220. The external device 130 can be programmed to execute both active and passive training of a neural decoding algorithm.

Self-Calibrating Neural Decoding

As generally noted above, one issue facing neural device systems, such as the system 100 described above in connection with FIG. 1, is the degradation in the ability to decode electrophysiological signals over time. In particular, neural device systems 100 tend to suffer from signal drift and/or signal quality degradation over time. Accordingly, neural device systems 100 should be continuously recalibrated to the subject 102 in order to accommodate for these factors. The embodiment of the system 100 described herein compensates for these issues and reduces the need for recalibration by making use of a sensor assembly 220 through which the subject 102 can be monitored, which in turn allows the system 100 to automatically calibrate over time, without requiring that the subject 102 perform any active recalibration tasks. In particular, after an initial calibration phase involving the active input of the user and training of one or more neural decoding algorithms, the system 100 uses passively collected information from the external sensors to keep the decoding algorithm calibrated against expected drift in the neural signals over time, thereby ensuring high performance of the neural interface while minimizing the amount of active calibration required.

Figure 4:
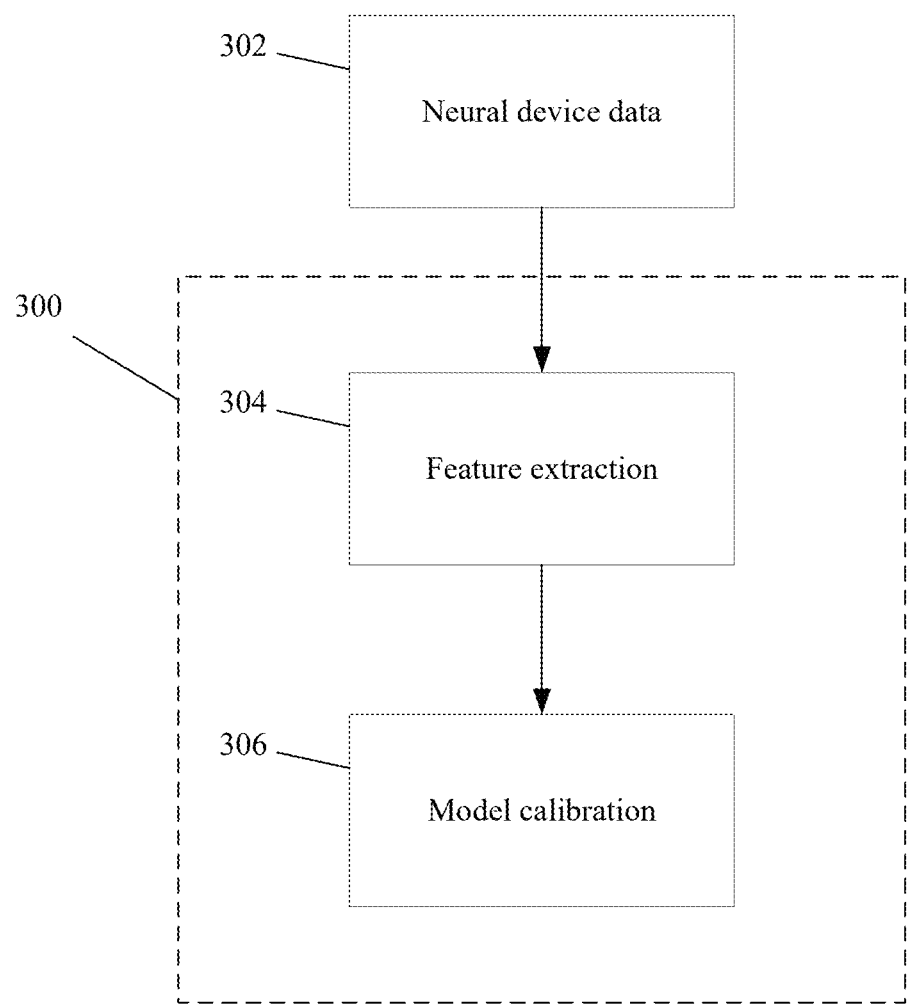
FIG. 4 depicts a diagram of a model for decoding signals from high-bandwidth neural interfaces, in accordance with an embodiment of the present disclosure.

Decoding signals from high-bandwidth neural interfaces, such as described above, can conceptually be represented by a two-stage model 300, as shown in FIG. 4. The first or feature extraction stage 304 maps raw neural device data 302 to abstract features that are relevant to determining both whether and what type of stimulus or intent has occurred. The second or model calibration stage 306 calibrates the algorithm or model by mapping the features determined from the feature extraction stage 304 into a final model output. For this second stage 306, a unique decoding algorithm should be trained for each individual user. Once the neural device 110 has been implanted, the user is asked to perform a series of task-specific actions to train an initial decoding algorithm, thereby calibrating the decoding algorithm to the individual user. For example, if the neural device 110 is being used for motor decoding, the user may be asked to perform (or, if unable to do so based on disability/injury, to imagine performing) various motor activities, such as walking, moving their arm to various positions, typing or writing letters, or jumping. If the neural device 110 is being used for speech decoding applications, the user may be asked to speak (or to imagine speaking) words or sentences from a predefined vocabulary. While the user is performing (or imagining performing) these tasks, time-synced neural data and/or derived data is recorded from the neural device(s) 110. This neural and/or derived data can then be utilized to calibrate the decoding algorithm for the individual user. Further, the neural and/or derived data can be transmitted and/or stored by the system 100 for subsequent analysis. The systems and methods described herein generally relate to the model calibration stage 306, wherein the neural decoding algorithm is recalibrated over time.

Figure 5:
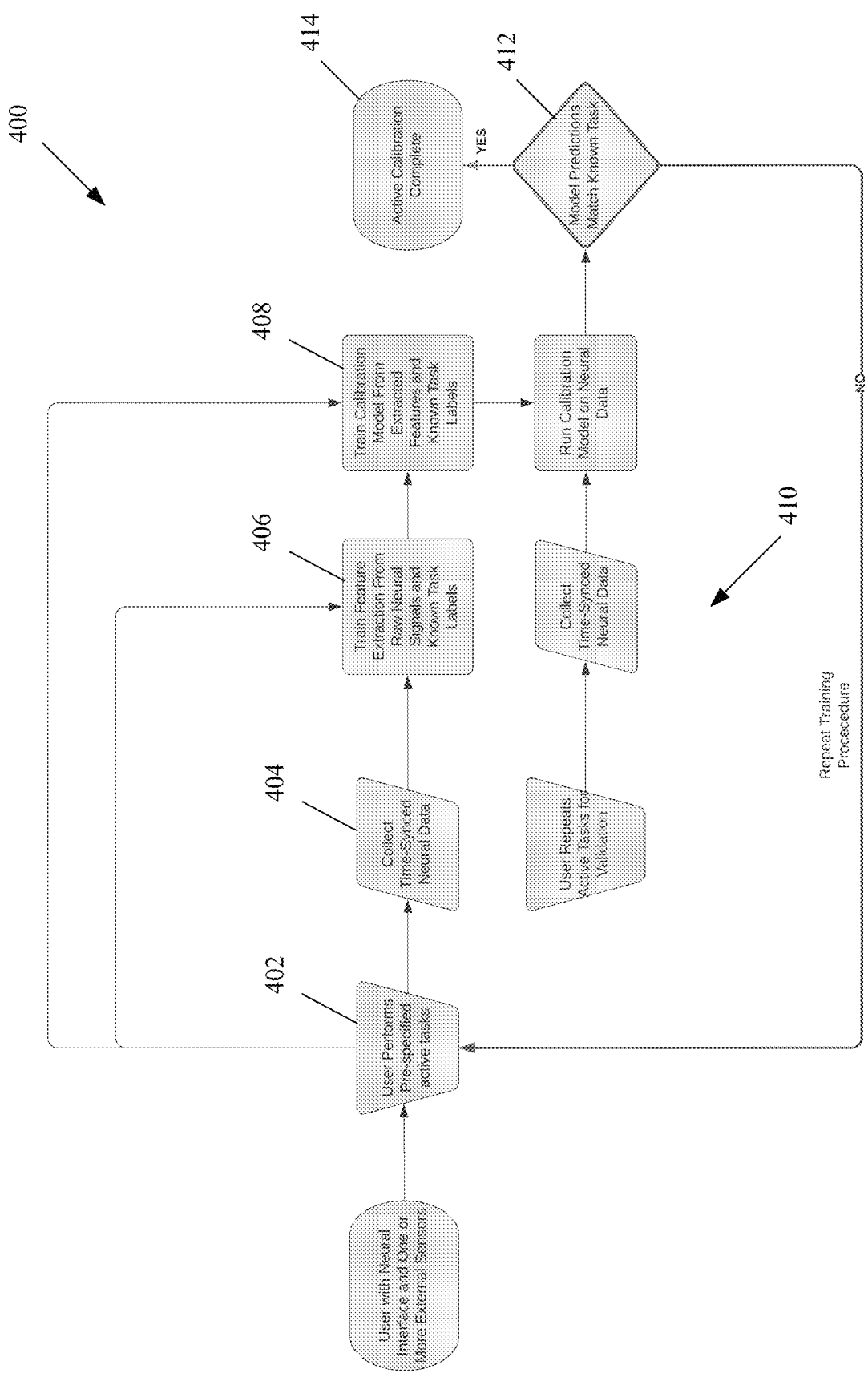
FIG. 5 depicts a process for calibrating neural devices utilizing external sensors, in accordance with an embodiment of the present disclosure.
Figure 6:
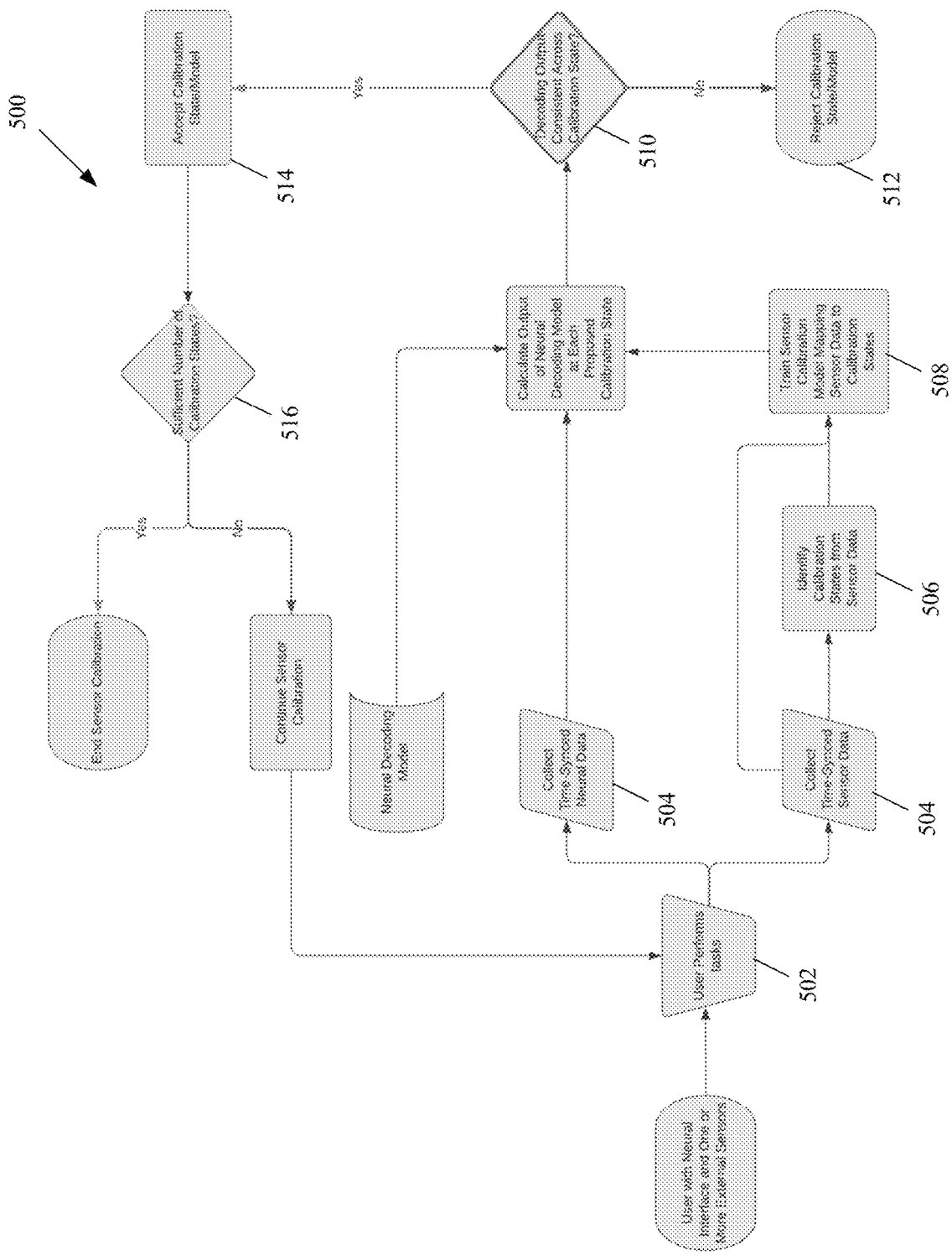
FIG. 6 depicts a process for using external sensory information for calibrating a neural device, in accordance with an embodiment of the present disclosure.
Figure 7:
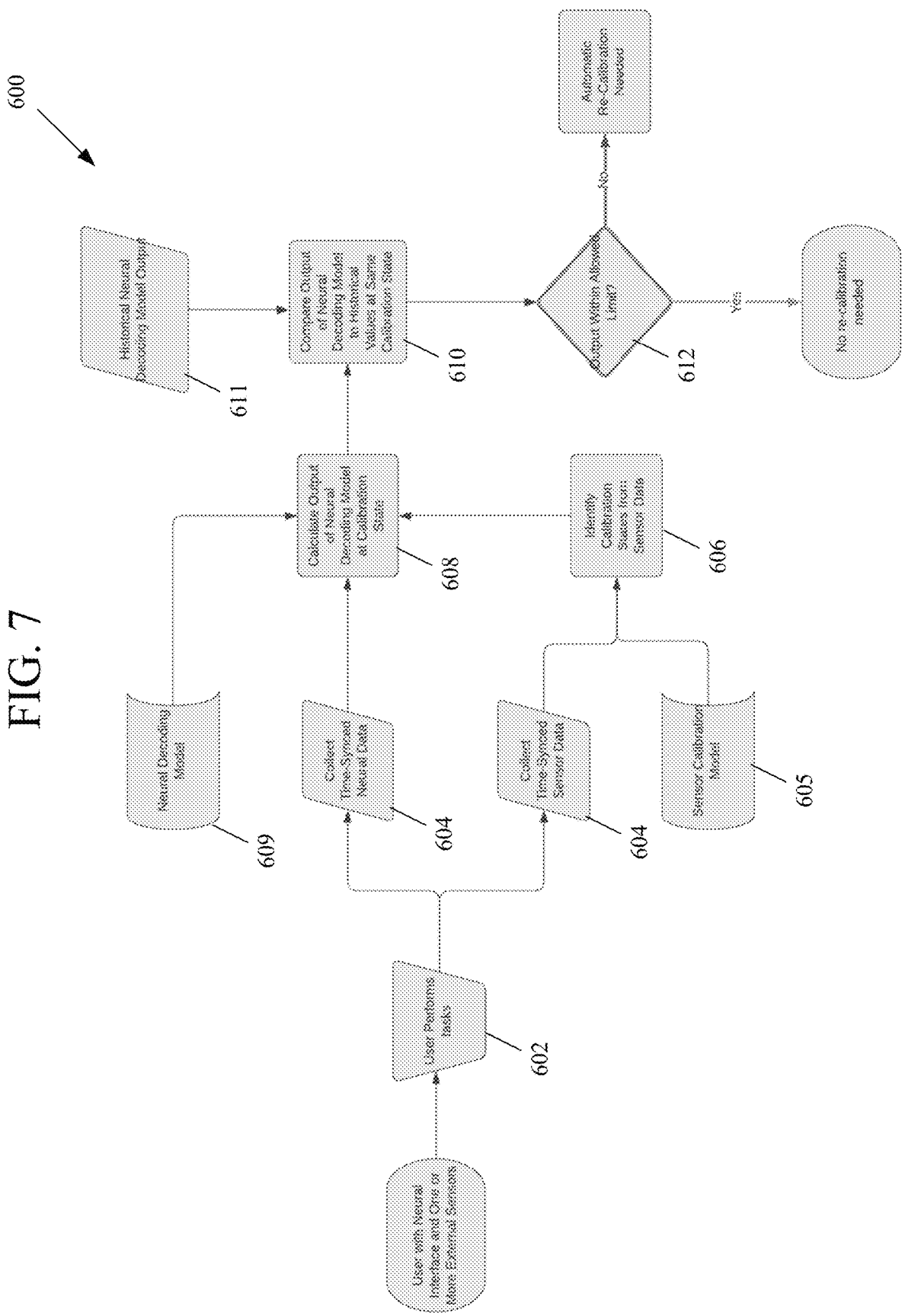
FIG. 7 depicts a process for automatically recalibrating neural decoding models over time based on identified sensor calibration states or models, in accordance with an embodiment of the present disclosure.

Various embodiments of processes for using sensor assemblies 220 to calibrate neural decoding algorithms are shown in FIGS. 5-7 and described below. In one embodiment, the processes can be embodied as instructions stored in a memory (e.g., the memory 172) that, when executed by a processor (e.g., the processor 170), causes the external device 130 to perform the process. In various embodiments, the processes can be embodied as software, hardware, firmware, and various combinations thereof. In various embodiments, the processes can be executed by and/or between a variety of different devices or systems. For example, various combinations of steps of the processes can be executed by the external device 130, the neural device 110, and/or other components of the system 100. In various embodiments, the system 100 executing the processes can utilize distributed processing, parallel processing, cloud processing, and/or edge computing techniques. The processes are described below as being executed by the system 100; accordingly, it should be understood that the functions can be individually or collectively executed by one or multiple devices or systems.

One embodiment of a process for performing an active calibration of a neural device 110 is shown in FIG. 4. After the neural interface has been implanted and external sensors configured, the user is instructed to perform 402 a sequence of defined motor tasks and/or is stimulated with a series of known sensory stimuli, depending on the exact type of neural decoding to be performed. During these defined tasks, the external device 130 simultaneously records 404 time-synced signals from the neural interface 110 and from the external sensors 220. As noted above, the decoding algorithm is trained in two stages. First, the external device 130 extracts 406 features from the raw neural signals/data 302 that are determined to be relevant to whether a known motor action or sensory stimulus is present and the exact nature of that task/stimulus. The external device 130 subsequently passes those features through one or several decoding calibration model(s) 408 that output a prediction on the probability of a motor action/sensory stimulus being present and the exact nature of the action/stimulus. After training, the quality of both the decoding feature extraction and calibration models are assessed by repeating 410 another defined sequence of motor tasks and/or sensory stimuli and verifying 412 that the model predictions match the actual tasks based on a predefined quality threshold. In one embodiment, the external device 130 could determine whether the model predictions correspond to the actual task by at least the predefined quality threshold. This process 400 of active training and validation may be repeated until the system is verified to be performing above the predefined quality threshold, at which point the active calibration is determined to be completed 414.

One embodiment of a process 500 for using external sensory information for calibrating a neural device is shown in FIG. 6. In this depicted process 500, external sensory information is recorded during and immediately following the active calibration phase by the sensor assembly 220. The external sensory information may be used to define one or more sensory calibration states and corresponding calibration models for the system, which can then be used for subsequent recalibration.

In particular, the subject 102 is asked to perform 502 one or more tasks. The tasks can be related to the type of decoding application for which the neural device 110 is being used. For example, if the neural device 110 is being used for a motor decoding application, the subject 102 can be asked to jump or perform some other physical activity. If the neural device 110 is being used for speech decoding applications, the user may be asked to speak or imagine speaking various words or phrases. While the user is performing (or imagining to perform) these tasks, the external device 130 records 504 time-synced neural data and/or derived data from the neural device(s) 110.

The external device 130 compares the recorded 504 time-synced sensor data to known (or potentially unknown) motor tasks or sensory stimuli to identify 506 calibration states and train 508 or define a sensor calibration model that maps the raw sensor data into one or more calibration "states" that capture what the user is doing or experiencing at any given point in time. For example, if the user is moving their head and the sensor is a head-mounted accelerometer, the potential calibration state(s) can be one or more head positions, and a potential calibration model would map accelerometer data into either one or none of those head positions. Similarly, if the user is viewing visual stimuli and the sensor is an eyewear mounted camera, the sensor states would be one or more visual objects in a one or more portions of the visual field, and the calibration model would attempt to map camera images into whether and where those visual objects appear in the visual field. Importantly, not every sensor calibration state or model needs to be defined during the active decoding calibration phase, provided that these states are reproducibly observed and provided that the interval between the active calibration phase and the identification of the sensor calibration states is short enough that there is expected to be limited to no drift in the decoding model over that interval.

Once initial sensor calibration states and models have been trained, those states/models are validated by comparing the output of the neural sensor and decoding model across multiple occurrences of the same sensor calibration state and potential sensor states in which the decoding model predictions that vary above some predefined threshold are rejected as calibration states. Only sensor states which show stability in the output of the decoding model over repeat occurrences of the sensor state are accepted as reliable calibration states. Active training may be repeated and/or varied until a sufficient number of reliable calibration states/models have been obtained. In particular, the external device 130 determines 510 whether the decoding output is consistent across the calibration states. If the output is not consistent, the external device 130 can reject 512 the calibration state or model. In some embodiments, the external device 130 can then reinitiate the process 500 to define new calibration states or models. If the output is consistent, the external device 130 can accept 514 the calibration state or model. In some embodiments, the external device 130 can further determine 516 whether a sufficient number of calibration states have been defined based on the received external sensory data. If a sufficient number of calibration states have not been defined, the external device 130 can continue executing the process 500. If a sufficient number of calibration states have been defined, the external device 130 can halt the process 500 and proceed with the defined calibration states or models.

One embodiment of a process 600 for automatically recalibrating neural decoding models over time based on identified sensor calibration states or models is depicted in FIG. 7. In this process 600, one or more sensor calibration models 605 can be continuously run on the time-synced sensor information that is available (i.e., as detected by the external sensors 220). Whenever one or more of the reliable calibration states is identified, the output of the neural decoding algorithm at that time can be compared to all historical decoding model predictions obtained from the same sensor calibration state during and since the last active calibration. If the neural decoding algorithm results deviate from the historical average by an amount that exceeds some predefined threshold, the system can attempt to perform automatic recalibration. During this automatic recalibration, the system can make small perturbations to the parameters of the neural decoding calibration model to bring the difference between the output of the decoding algorithm at a particular sensor calibration state and the historical results of the decoding algorithm at the same calibration state, back to within the predefined threshold. If this is achieved, those new parameters can become proposed calibration parameters. Before the calibration model can be updated, the proposed calibration parameters can be cross-validated against additional occurrences of the sensor calibration states; updates that reduce the variance between neural decoding model outputs and historical outputs across multiple sensor calibration states can be accepted, and become the new decoding calibration model. If the system is unable to reduce the variance between current and historical outputs to below the predefined threshold, or if doing so results in significant deviation across other calibration states, the automatic calibration can fail. If multiple failures are recorded in a given period of time, the user can be prompted for the need for repeat active calibration.

In particular, the subject 102 is asked to perform 602 a task, such as a motor task. As the subject 102 performs 602 the task, the external device 130 collects 604 time-synced data from the neural device 110 and the sensors 220. Based on the collected 604 data, the external device 130 identifies 606 a calibration state by comparing the collected 604 sensor data to one or more stored calibration models (e.g., as defined using the process 500 shown in FIG. 6). The external device 130 further calculates 608 the output of the neural decoding model 609 and compares 610 the calculated output of the neural decoding model to historical values 611 for the calibration state that had been identified 606. Accordingly, the external device 130 determines 612 whether the output of the neural model falls within a predefined allowed limit relative to the historical values 611. If the output is outside of the allowed limit, the external device 130 can automatically recalibrate the neural model, e.g., by making small perturbations to the parameters of the neural decoding calibration model to bring the difference between the output of the decoding algorithm at a particular sensor calibration state, as discussed above. If the output is within the allowed limit, the external device 130 can determine that no recalibration is required.

It should be noted that various embodiments of the processes for automatically recalibrating the neural devices 110 can be used in a variety of different neural decoding applications, including motor decoding, visual decoding, somatosensory/tactile decoding, and auditory decoding. Various examples of these specific implementations can be discussed further below.

In one embodiment, the system 100 can be used in a motor decoding application. In this example, the sensors 220 can include a 6-axis inertial sensor for tracking both linear and angular acceleration is attached to the head of a user who has a neural implant placed over the motor cortex. During active calibration of the system 100, the subject 102 can be asked to move their head to known orientations relative to gravity. Each head position can represent a sensor calibration state and a mapping between inertial sensor data and those head positions can serve as a sensor calibration model, using standard methods known to one skilled in the art. The results of the neural decoding algorithm can be recorded during each of those sensor calibration states during active training and in the days immediately following the active training session. Subsequently, the sensor calibration model can run continuously on the inertial sensor data and whenever the sensor calibration model detects that the user has entered one of the known calibration states, the output of the neural decoding model can be compared to the stored historical examples from the same calibration state. If the output is within a predefined threshold of the historical average, the result can be appended to the historical data and no further action taken. If the output is outside the predefined threshold, the system 100 can attempt automatic calibration, varying the parameters of the decoding model to reduce the variance between the current output of the neural decoding model and the historical averages. If automatic calibration succeeds in reducing the variance back to within the predefined threshold, those new parameters can become proposed calibration parameters, and tested against the next several instances of one or more known sensor calibration states. If those repeat calibrations pass, the proposed calibration parameters can become the new neural decoding calibration parameters, and automatic calibration can succeed. If those repeat calibrations fail, the proposed calibration parameters can be rejected, and automatic calibration can fail. If the system 100 fails automatic calibration multiple times over a given period of time, the system 100 can flag the user that active calibration is needed.

In one embodiment, the system 100 can be used in a visual decoding and stimulation application. In this example, a visually impaired user can wear an eyeglass or head-mounted camera while simultaneously having a visual prosthetic (e.g., located in the retina, optic tracts, or visual cortex) and a neural implant placed over the visual cortex, which is capable of recording visual activity. During active calibration of the system, the subject 102 can be asked to look at a computer or mobile device screen where various images can be presented in different locations of the visual field. Each combination of image and location can represent a sensor calibration state and a mapping between the camera data and those calibration states can serve as a sensor calibration model, using standard methods known to one skilled in the art. Because the set of potential images is large, the calibration data can be selected from images that are expected to be common in the user's environment following calibration, for example, background images on computer desktops and/or mobile devices, photos of family members, or application icons. The results of the neural decoding algorithm can be recorded during each of those sensor calibration states during active training and in the days immediately following the active training session. Subsequently, the sensor calibration model can run continuously on the camera data, in a manner identical to that described for motor decoding applications described above, i.e., whenever the sensor calibration model detects that the user has entered one of the known calibration states, the output of the neural decoding model can be compared to the stored historical examples from the same calibration state. If the output is within some predefined threshold of the historical average, the result can be appended to the historical data and no further action taken. If the output is outside the predefined threshold, the system 100 can attempt automatic calibration, varying the parameters of the decoding model to reduce the variance between the current output of the neural decoding model and the historical averages. If automatic calibration succeeds in reducing the variance back to within the predefined threshold, those new parameters can become proposed calibration parameters and tested against the next several instances of one or more known sensor calibration states. If those repeat calibrations pass, the proposed calibration parameters can become the new neural decoding calibration parameters, and automatic calibration can succeed. If those repeat calibrations fail, the proposed calibration parameters can be rejected, and automatic calibration can fail. If the system fails automatic calibration multiple times over a given period of time, the system 100 can flag the user that active calibration is needed.

In one embodiment, the system 100 can be used in a somatosensory/tactile decoding application. In this example, one or more touch sensitive devices, such as a keyboard or mobile device touchscreen, can be used by the user with a neural implant placed over the somatosensory cortex. During active calibration of the system, the subject 102 can be asked to type on the keyboard or select specific targets on the touchscreen using known figures and with varying levels of pressure. Alternatively, the subject 102 may receive sensory input on a known location of their body using haptics embedded in the mobile device. Each combination of touch event and body location can represent a sensor calibration state and a mapping between the touch-sensitive device data and those calibration states can serve as a sensor calibration model, using standard methods known to one skilled in the art. The results of the neural decoding algorithm can be recorded during each of those sensor calibration states during active training and in the days immediately following the active training session. Subsequently, the sensor calibration model can run continuously on the touch-sensitive device, in a manner identical to that described above for the motor and visual decoding applications.

In one embodiment, the system 100 can be used in an auditory decoding application. In this example, one or more microphones can be placed in a standard position (e.g., attached to an earpiece or worn on the user's shirt) can be worn by the user with a neural implant placed over the auditory cortex. During active calibration of the system, the subject 102 can listen to tones and sounds of varying frequency and volume. Each combination of sound and sound location can represent a sensor calibration state and a mapping between the microphone data and those calibration states can serve as a sensor calibration model, using standard methods known to one skilled in the art. The results of the neural decoding algorithm can be recorded during each of those sensor calibration states during active training and in the days immediately following the active training session. Subsequently, the sensor calibration model can run continuously on the touch-sensitive device, in a manner identical to that described for the other applications.

It should further be noted that, although the functions and/or steps of the processes are depicted in a particular order or arrangement, the depicted order and/or arrangement of steps and/or functions is simply provided for illustrative purposes. Unless explicitly described herein to the contrary, the various steps and/or functions of the processes can be performed in different orders, in parallel with each other, in an interleaved manner, and so on.

This disclosure is not limited to the particular systems, devices and methods described, as these may vary. The terminology used in the description is for the purpose of describing the particular versions or embodiments only and is not intended to limit the scope of the disclosure.

The following terms shall have, for the purposes of this application, the respective meanings set forth below. Unless otherwise defined, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention.

As used herein, the term "implantable medical device" includes any device that is at least partially introduced, either surgically or medically, into the body of a subject and is intended to remain there after the procedure.

As used herein, the singular forms "a," "an," and "the" include plural references, unless the context clearly dictates otherwise. Thus, for example, reference to a "protein" is a reference to one or more proteins and equivalents thereof known to those skilled in the art, and so forth.

As used herein, the term "about" means plus or minus 10% of the numerical value of the number with which it is being used. Therefore, about 50 mm means in the range of 45 mm to 55 mm.

As used herein, the term "consists of" or "consisting of" means that the device or method includes only the elements, steps, or ingredients specifically recited in the particular claimed embodiment or claim.

In embodiments or claims where the term "comprising" is used as the transition phrase, such embodiments can also be envisioned with replacement of the term "comprising" with the terms "consisting of" or "consisting essentially of."

As used herein, the term "subject" as used herein includes, but is not limited to, humans and nonhuman vertebrates such as wild, domestic, and farm animals.

While the present disclosure has been illustrated by the description of exemplary embodiments thereof, and while the embodiments have been described in certain detail, it is not the intention of the Applicants to restrict or in any way limit the scope of the appended claims to such detail. Additional advantages and modifications will readily appear to those skilled in the art. Therefore, the disclosure in its broader aspects is not limited to any of the specific details, representative devices and methods, and/or illustrative examples shown and described. Accordingly, departures may be made from such details without departing from the spirit or scope of the Applicant's general inventive concept.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

In addition, even if a specific number is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In those instances where a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, sample embodiments, or drawings, should be understood to contemplate the possibilities of including one of the terms, either of the terms, or both terms. For example, the phrase "A or B" will be understood to include the possibilities of "A" or "B" or "A and B."

In addition, where features of the disclosure are described in terms of Markush groups, those skilled in the art will recognize that the disclosure is also thereby described in terms of any individual member or subgroup of members of the Markush group.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

The invention claimed is:

1. A neural device system for use with a subject, the neural device system comprising:
 a neural device configured to sense data associated with the subject or receive control input, the neural device comprising an electrode array configured to stimulate or record from neural tissue with which the electrode array is engaged;
 a sensor configured to detect a state associated with the subject; and
 a computer system communicably coupled to the neural device and the sensor, the computer system comprising a processor and a memory, the memory storing instructions that, when executed by the processor, cause the computer system to:
  recalibrate a neural decoding model based on the state detected via the sensor, wherein the neural decoding model correlates the data received from the neural device with a corresponding thought or action performed by the subject by:
   recording a plurality of time-synced signals from the neural device and the sensor, determining which of the plurality of time-synced signals are relevant to whether a known action is occurring, extracting features from the plurality of time-synced signals determined to be relevant, retraining the neural decoding model on the extracted features, outputting a prediction on a probability of the known action being occurring using the retrained neural decoding model, and determining whether the prediction from the retrained neural decoding model correspond to the known task according to a predefined quality threshold.

2. The neural device system of claim 1, wherein the sensor is selected from the group consisting of an inertial sensor, a camera, a tactile sensor, and a microphone.

3. The neural device system of claim 1, further comprising a plurality of sensors configured to detect a plurality of states associated with the subject.

4. The neural device system of claim 1, wherein the computer system is configured to recalibrate the neural decoding model based on the state detected via the sensor by:

calculating an output of the neural decoding model for the data received from the neural device;

determining the state associated with the subject via the sensor;

retrieving historical values of the output of the neural decoding model to the determined state; and determining whether the calculated output of the neural decoding model is within an allowed limit from the historical values.

5. The neural device system of claim 1, wherein the recalibration of the neural decoding model is repeated for a plurality of defined tasks.

6. The neural device system of claim 1, wherein the known action comprises hand motor output.

7. The neural device system of claim 1, wherein the known action comprises speech.

8. The neural device system of claim 1, wherein the known action comprises text generation.

9. The neural device system of claim 1, wherein the neural device comprises a subdural implanted neural device.

10. A computer-implemented method of recalibrating a neural decoding model associated with a subject, the method comprising:

receiving, by a computer system via a neural device comprising an electrode array configured to stimulate or record from neural tissue with which the electrode array is engaged, data associated with the subject, the neural device comprising an electrode array configured to stimulate or record from neural tissue with which the electrode array is engaged;

detecting, by the computer system via a sensor, a state associated with the subject; and recalibrating, via the computer system, the neural decoding model based on the state detected via the sensor, wherein the neural decoding model correlates the data received from the neural device with a corresponding thought or action performed by the subject by:

recording a plurality of time-synced signals from the neural device and the sensor, determining which of the plurality of time-synced signals are relevant to whether a known action is occurring, extracting features from the plurality of time-synced signals determined to be relevant, retraining the neural decoding model on the extracted features, outputting a prediction on a probability of the known action being occurring using the retrained neural decoding model, and determining whether the prediction from the retrained neural decoding model correspond to the known task according to a predefined quality threshold.

11. The computer-implemented method of claim 10, wherein the sensor is selected from the group consisting of an inertial sensor, a camera, a tactile sensor, and a microphone.

12. The computer-implemented method of claim 10, further comprising a plurality of sensors configured to detect a plurality of states associated with the subject.

13. The computer-implemented method of claim 10, wherein recalibrating the neural decoding model comprises:

calculating, by the computer system, an output of the neural decoding model for the data received from the neural device;

determining, by the computer system, the state associated with the subject via the sensor;

retrieving, by the computer system, historical values of the output of the neural decoding model to the determined state; and determining, by the computer system, whether the calculated output of the neural decoding model is within an allowed limit from the historical values.

14. The computer-implemented method of claim 10, wherein recalibrating the neural decoding model is repeated for a plurality of defined tasks.

15. The computer-implemented method system of claim 10, wherein the known action comprises hand motor output.

16. The computer-implemented method of claim 10, wherein the known action comprises speech.

17. The computer-implemented method of claim 10, wherein the known action comprises text generation.

18. The computer-implemented method of claim 10, wherein the neural device comprises a subdural implanted neural device.

* * * * *